(12) United States Patent
Chu et al.

(10) Patent No.: US 12,733,037 B2
(45) Date of Patent: Sep. 8, 2026

(54) DEVICE, SYSTEM, AND METHOD FOR COORDINATING RESTRICTED TARGET WAKE TIME SERVICE PERIODS OF A PLURALITY OF ACCESS POINTS

(71) Applicant: NXP USA, Inc., Austin, TX (US)

(72) Inventors: Liwen Chu, San Ramon, CA (US); Kiseon Ryu, San Diego, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 293 days.

(21) Appl. No.: 18/479,845

(22) Filed: Oct. 3, 2023

(65) Prior Publication Data

US 2024/0114553 A1 Apr. 4, 2024

Related U.S. Application Data

(60) Provisional application No. 63/378,312, filed on Oct. 4, 2022.

(51) Int. Cl.
*H04W 74/0816* (2024.01)
*H04W 52/02* (2009.01)

(52) U.S. Cl.
CPC ... *H04W 74/0816* (2013.01); *H04W 52/0248* (2013.01)

(58) Field of Classification Search
CPC ...................... H04W 74/0816; H04W 52/0248
See application file for complete search history.

(56) References Cited

U.S. PATENT DOCUMENTS

2014/0016612 A1* 1/2014 Montemurro ......... H04W 84/12 370/331
2021/0306955 A1* 9/2021 Han ..................... H04W 16/02
2022/0110053 A1 4/2022 Chu et al.
2023/0026249 A1 1/2023 Chu et al.
2023/0058871 A1* 2/2023 Xin ....................... H04W 72/56
2023/0140312 A1* 5/2023 Ajami ............... H04W 74/0866 370/329

FOREIGN PATENT DOCUMENTS

WO WO-2022204335 A1 * 9/2022 ......... H04L 47/2416
WO WO-2024148549 A1 * 7/2024

OTHER PUBLICATIONS ip.com, "Coordination of Mixed APs and STAs," published May 4, 2022, downloaded from https://priorart.ip.com/IPCOM/000269691 Sep. 27, 2023, , 18 pages.
Lu, Liuming, "Multi-AP Coordination for Low Latency Traffic Delivery," IEEE 802.11-22/1556r1, Sep. 6, 2022, 14 pages.
Ibrahim, Ahmed, "Multi-AP: TWT Information Sharing," IEEE 802.11-21/1046r2, Sep. 7, 2021, 7 pages.

(Continued)

*Primary Examiner* — Ayaz R Sheikh

(57) ABSTRACT

An AP receives a frame comprising an indication of a restricted target wake up time schedule service period (r-TWT SP) from a wireless device. The AP one or more of adjusts an r-TWP SP of the AP based on the indication of the r-TWT SP indicated in the received frame and announcing that an STA associated with the AP is to terminate a transmit opportunity (TXOP) before the r-TWT SP indicated in the received frame begins.

20 Claims, 10 Drawing Sheets

(56) References Cited

OTHER PUBLICATIONS

Shafin, Rubayet, "Multi AP coordination for next-generation Wi-Fi," IEEE 802.11-21/1530r1, Sep. 26, 2022, 10 pages.
802.11 Working Group of the LAN/MAN Standards Committee of the IEEE Computer Society; "IEEE P802.11be/D4.0 Draft Standard for Information technology—Telecommunications and information exchange between systems Local and metropolitan area networks—Specific requirements; Part 11: Wireless LAN Medium Access Control (MAC) and Physical Layer (PHY) Specification: Amendment 8: Enhancements for extremely high throughput (EHT): Section 35.8 Restricted TWT (R-TWT);" 50 pages (Jul. 2023).

* cited by examiner

DEVICE, SYSTEM, AND METHOD FOR COORDINATING RESTRICTED TARGET WAKE TIME SERVICE PERIODS OF A PLURALITY OF ACCESS POINTS

CROSS-REFERENCE TO RELATED APPLICATIONS

This application is entitled to the benefit of U.S. Provisional Patent Application Ser. No. 63/378,312, filed Oct. 4, 2022, entitled "Coordination among Multiple APs", the contents of which is incorporated by reference herein in its entirety.

FIELD OF USE

This disclosure generally relates to wireless communication, and more particularly to coordinating restricted target wake up time service periods of a plurality of access points.

BACKGROUND

A wireless network includes a plurality of access points (APs) which transmit and receive frames with a plurality of client stations (STA) over a communication link. Target Wake Time (TWT) which is a feature of the Institute of Electrical and Electronics Engineers (IEEE) 802.11 standard defines a wake time of the access point (AP) and the STAs to facilitate scheduling of frames and improve power efficiency. Some applications (e.g., cloud gaming, AR glasses) can have periodic burst traffic with very strict latency requirements. A restricted target wake time service period (r-TWT SP) better supports latency sensitive applications. The AP reserves the communication link for the r-TWT SP to transmit or receive latent sensitive frames and sends quiet elements to other STAs in a basic service set (BSS) which are not members of the restricted TWT SP. The restricted TWT SP member STAs have a guaranteed channel access opportunity which helps flow of the latency-sensitive frames.

An AP and associated respective STA define a basic service set (BSS) and multiple BSS coupled together form an extended service set (ESS) or wireless local area network (WLAN) having a service set identifier (SSID). A neighbor AP is defined as an access point in a communication range with another AP. An AP knows the r-TWT SP of its neighbor APs in a same or different ESS and typically announces the r-TWT SP of its neighbor APs. The AP and the STA associated with the AP transmits frames during a transmit opportunity (TXOP) within the r-RWT SP of the AP and stops transmitting at a beginning of the r-TWT of the neighbor APs to reduce interference. The TXOP is a time duration during which the AP and STA exchange frames.

BRIEF DESCRIPTION OF THE DRAWINGS

Throughout the description, similar reference numbers may be used to identify similar elements.

DETAILED DESCRIPTION

Figure 1:
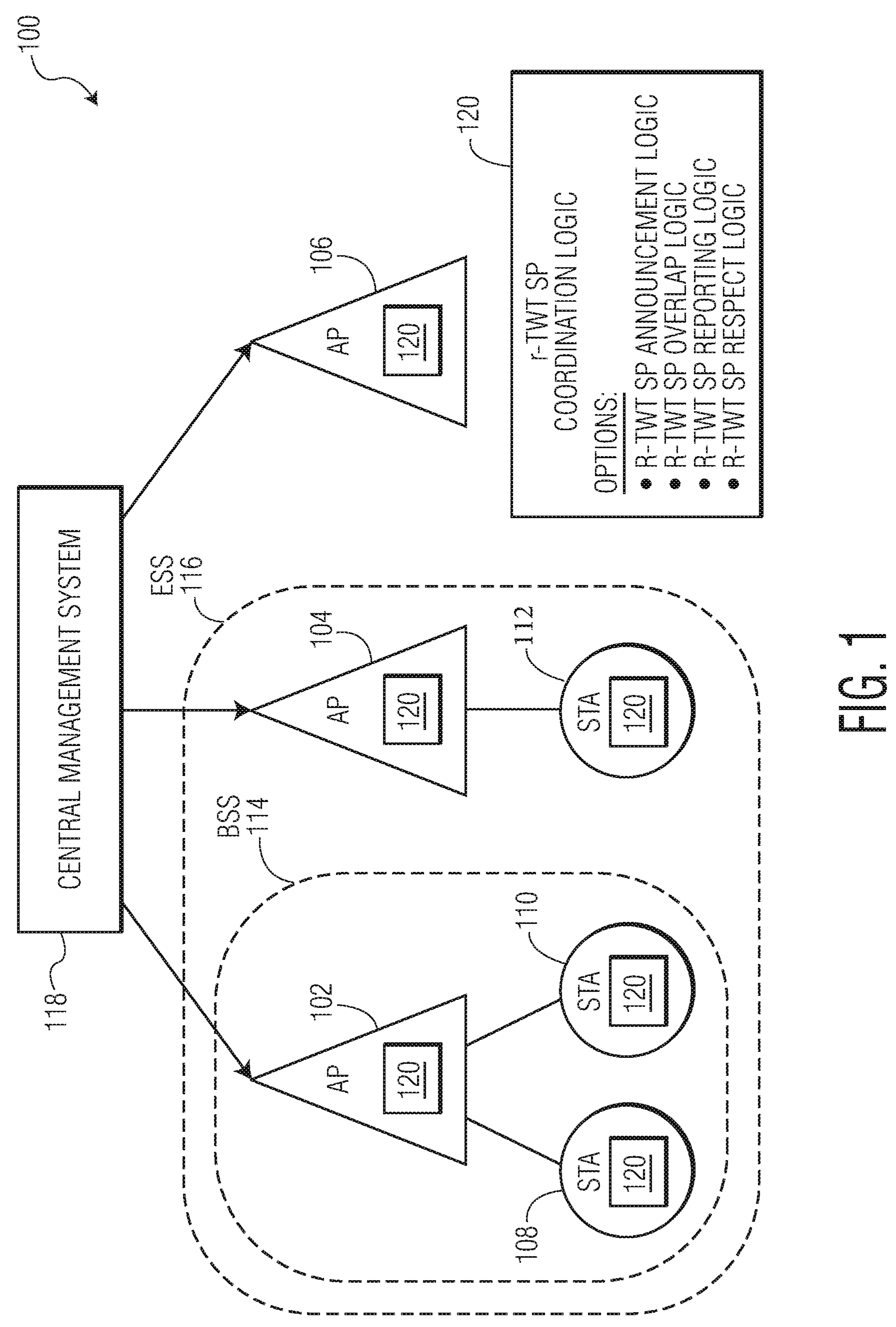
FIG. 1 depicts an example wireless system for coordinating frame transmission based on a restricted target wake up time service period (r-TWT SP) in accordance with an embodiment.

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Embodiments disclosed herein are directed to coordinating frame exchange between an access point (AP) and a client station (STA) based on restricted target wake up time service periods (r-TWT SPs) of the AP and one or more other APs. Each AP announces its r-TWT SP information and r-TWT SP information of neighbor APs in a management frame such as a beacon frame or action frame. The r-TWT SP announcement allows an AP to acquire the r-TWT SP information of other APs. The r-TWT SP announcement also improves medium efficiency. Based on the announcement, an AP is able to identify other APs which are two hop neighbors and overlap its r-TWT SP with the other APs. The overlap also allows an AP to have additional medium time for frame exchange. In examples, an STA also reports one or more of the r-TWT SP information of neighbor APs to the STA and the r-TWT SP information of a neighbor AP's neighbor AP. In an example, the report is provided when there is an overlap with the r-TWT SP of the AP associated with the STA. Further, the STA causes the associated AP to initiate an r-TWT SP negotiation with the STA to avoid the AP from selecting an r-TWT SP which overlaps with an r-TWT SP of a neighboring AP to the STA. In an example, an AP and a neighboring AP might be in different extended service sets (ESS) and the AP is arranged to announce or negotiate whether it respects the r-TWT SPs of the neighbor AP. In an example, an AP and a neighboring AP might be in a same extended service sets (ESS) and the AP is arranged to announce or negotiate whether it respects the r-TWT SPs of the neighbor AP. In some examples, the STA does not need to stop its TXOP at the start time of a neighbor AP's r-TWT SP, i.e. respect the neighbor AP's r-TWT SP. When an AP announces a neighbor AP's r-TWT SP information to associated STAs, the AP announces additional information indicating which STA (e.g., some of associated non-AP STAs) should follow the r-TWT SP for the neighbor AP r-TWT SP. The additional information could indicate the information that non-AP STA in a basic service set (BSS)

should consider when the non-AP STA decides whether it needs to respect the neighbor AP's r-TWT SP or should not respect the neighbor AP's r-TWT SP. Additionally, or alternatively, the additional information is a received signal strength indicator (RSSI) of the neighbor AP or the other information (signal quality). Alternatively, an AP may transmit to a non-AP STA as an individually addressed management frame which includes the neighbor AP's r-TWT SP information and optionally the additional information described above. Well known instructions, protocols, structures, and techniques have not been shown in detail in order not to obfuscate the description.

FIG. 1 depicts an example wireless system 100 for coordinating frame transmission based on restricted target wake up time service periods (r-TWT SP) of access points (APs) in accordance with an embodiment. The wireless system 100 includes one or more wireless devices such as one or more access points (APs) 102-106 and one or more client stations (STA or non-AP STAs) 108-112 which are non-APs that operate based on the Institute of Electrical and Electronics Engineers (IEEE) 802.11 standard such as IEEE 802.11be or 802.11bn. The wireless system 100 may have fewer or more APs or STAs than as illustrated. Each AP as described herein may be a single physical AP which presents itself as a single access point in contrast to a virtual AP which is one of a plurality of virtual access points located in a physical AP that presents itself as multiple virtual APs. Each AP could be a virtual AP that belong to a multiple BSSID set. Each AP may also be affiliated with respective AP multi-link device (MLD). The STA may be an end device which wirelessly communicates with an AP by a wireless network protocol such as IEEE 802.11, while the AP may allow connections by nearby associated devices such as STAs to access a network such as the Internet via a wireless network protocol. The STA may also be affiliated with a non-AP MLD.

A basic service set (BSS) defines a network topology which includes an AP and one or more STA associated with the AP. An AP and STA as described herein may be associated based on an association process defined by IEEE 802.11. In an example, AP 102 and STA 108-110 may define a BSS 114. BSS information may include capabilities and operating parameters of the BSS 114 such as one or more of a number of channels of the BSS 114 and a BSS identification (BSSID) such as an media access communication (MAC) address of the access point 102 in the BSS 114. In an example, the AP 102 may transmit a management frame such as a beacon frame or action frame with the BSS information in an example to the associated STAs. In 802.11, the beacon frame is one of the management frames. The beacon frame contains information about the network or BSS. Beacon frames are transmitted periodically, and they serve to announce the presence of a wireless LAN or BSS and to synchronize the members of the service set. Beacon frames are transmitted by the AP in the BSS.

One or more BSS may be also coupled together to form an extended service set (ESS). In an example, AP 102, 104 and STA 108-112 may define an ESS 116. The ESS 116 which includes the multiple APs 102, 104 allows the STAs 108-112 to roam anywhere in an area covered by the multiple APs and appear to the STAs as a single, seamless network that is too large for reliable coverage by a single AP.

In an example, a neighbor in the wireless system 100 may be defined by a wireless device which is in a communication range of another wireless device. For example, an AP may be a neighbor of another AP if the AP is able to receive a frame from the other AP with an acceptable signal strength while if the AP is not able to receive the frame from the other AP with an acceptable signal strength then the AP may not be a neighbor of the other AP. As another example, an AP may be a neighbor of an STA if the STA is able to receive a frame from the AP with an acceptable signal strength while if the STA is not able to receive the frame from the AP with an acceptable signal strength then the STA may not be a neighbor of the AP. The neighbors are illustrated in the wireless system 100 as being proximate to each other. For example, AP 102 and AP 104 may be neighbors while AP 106 may not be a neighbor to AP 102. As another example, STA 108 may be a neighbor to STA 110 while STA 112 may not be a neighbor to 108. Other variations are also possible.

In an example, an AP may define a time when an STA in a BSS may exchange frames with the associated AP. The time is referred to as a restricted target wake up time (r-TWT) service period (SP) defined by IEEE 802.11be. The AP is arranged to be ready and available to do the frame exchanges with the STAs (r-TWT members) during this r-TWT SP and reserve a communication medium during the r-TWT SP to allow for transmitting or receiving latent sensitive frames with the STAs (r-TWT members) in the BSS to achieve more predictable latency for the frames. In an example, the STA and AP may exchange frames during a transmit opportunity (TXOP) time within the r-TWT SP. The TXOP is a time duration during with the STA can send frames to the associated AP over the reserved communicated medium and vice versa.

Embodiments disclosed herein are directed to one or more of the APs and the STAs having respective r-TWT SP coordination logic 120 to facilitate transmissions based on r-TWT SP of other APs. In an example, the APs 102-106 in a same ESS may be in communication with a central management entity 118, or acquire the neighbor AP's r-TWT SP information through monitoring the beacon of the neighbor AP or doing management frame exchange with the neighbor AP. The central management system 118 may communicate with each of the APs in the ESS and facilitate exchange of r-TWT SP information between the APs in the ESS such as the r-TWT SP information of neighbor APs to a respective AP. In an example, r-TWT SP announcement logic of the coordination logic may cause an AP to announce its r-TWT SP and the r-TWT SP of its neighbor APs. The announcement may be a broadcast of a frame in an example where the frame is not addressed to a particular wireless device. In an example, the announcement may also include an indication of an AP associated with the r-TWT SP such as the BSSID and the SSID of the AP. In another example, r-TWT SP overlap logic of the coordination logic may cause an AP to adjust its r-TWT SP based on an announced r-TWT SP of another AP. In yet another example, r-TWT SP reporting logic of the coordination logic 120 may cause an STA to report an announced r-TWT SP information of the neighbor BSS to its associated AP. The reporting may be a transmission of a frame addressed to the associated AP in an example as compared to a broadcast where the frame is not addressed to a particular wireless device. In an example, r-TWT SP respect logic of the coordination logic 112 may facilitate coordination of transmissions in a same ESS or different ESS to reduce interference. In an example, a TXOP associated with an AP or STA may not continue at the start time of an r-TWT SP of another AP. In an example, the communication as disclosed herein including the announcement or reporting may be carried in one or more management frames such as a beacon frame or action frame. In an example, the r-TWT SP coordination logic 120 of the AP may include the r-TWT SP announcement logic, r-TWT SP overlap logic, and the r-RWT SP respect logic while the r-TWT SP coordination logic 120 of the STA may include the r-TWT SP reporting logic and the r-RWT SP respect logic. In an example, the wireless system 100 and components therein may be implemented with circuitry such as one or more of analog circuitry, mix signal circuitry, memory circuitry, logic circuitry, and processing circuitry that executes code stored in a memory that when executed by the processing circuitry performs the disclosed functions, among other implementations, on a system on a chip (SoC).

Figure 2:
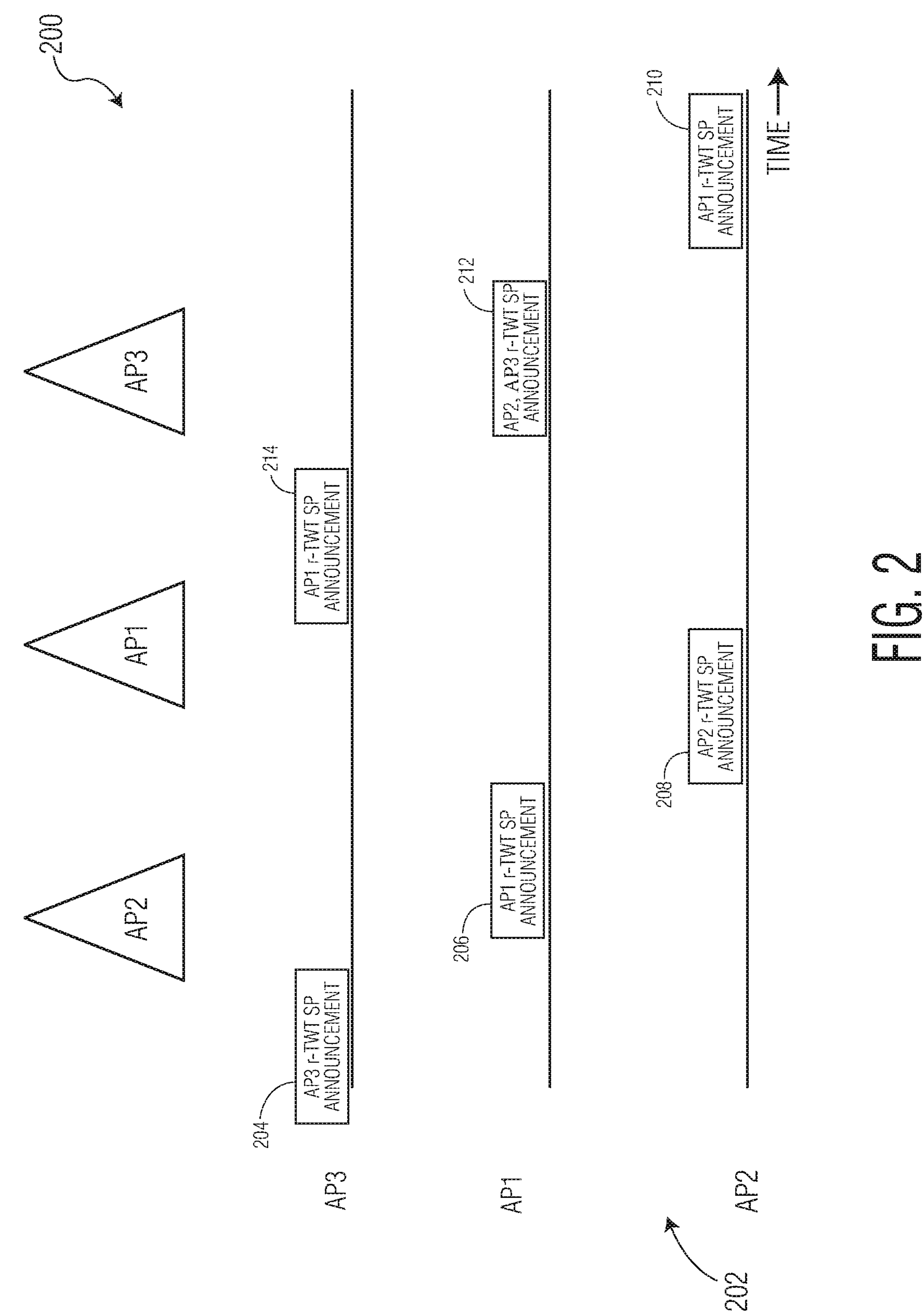
FIG. 2 illustrates example announcements of r-TWT SP information of an access point (AP) and its neighbor AP in a wireless system in accordance with an embodiment.

FIG. 2 illustrates example announcements of r-TWT SP information of an AP and its neighbor AP in a wireless system 200 in accordance with an embodiment. The wireless system 200 may include a plurality of APs and in the example the wireless system 200 may include AP1, AP2, AP3. In an example, AP2 and AP3 may be neighbors to AP1 and AP2 and AP3 may not be neighbors.

AP1 may transmit a frame. The AP2 and AP3 may be in a communication range of AP1 and able to receive the frame. In the illustration, APs in a communication range are illustrated as neighbors to each other and are referred to as one hop neighbors since the frame is received by one hop. In an example, AP1 is shown as a neighbor to AP2 and AP3 to indicate AP1 is in a communication range with AP2 and AP3. In an example, AP3 and AP2 may not be in a communication range. If AP3 (AP2) transmits a frame AP1 may receive the frame but AP2 (AP3) would not be able to receive the frame because AP3 (AP2) is not in a communication range to AP2 (AP3). In the illustration, AP1 is illustrated to be in between AP3 and AP2 to show that AP3 and AP2 are not neighbors. In order for AP2 to acquire AP3's r-TWT SP information, AP1 needs to forward AP3's r-TWT SP information to AP2. In order for AP3 to acquire AP2's r-TWT SP information, AP1 needs to forward AP2's r-TWT SP information to AP3. For example, in AP1's beacon, AP3's r-TWT SP information is tagged as AP1's 1-hop AP's r-TWT SP information with AP1's r-TWT SP information (and the non-transmitted BSSID AP's r-TWT SP information of AP1 is included with transmitted BSSID AP r-TWT SP information). Similarly, in AP1's beacon, AP2's r-TWT SP information is tagged as AP1's 1-hop AP's r-TWT SP information with AP1's r-TWT SP information (and the non-transmitted BSSID AP's r-TWT SP information of AP1 is included with transmitted BSSID AP r-TWT SP information). In this way, AP3 is a two hop neighbor of AP2 because AP3 is not able to detect AP2's Beacon (and the frame exchanges between AP2 and AP2's associated STAs) and AP3's associated STA does not report AP2's beacon information. Similarly, AP2 is a two hop neighbor of AP3 because AP2 is not able to detect AP3's beacon (and the frame exchanges between AP3 and AP3's associated STAs) and AP2's associated STA does not report AP3's beacon information. The frame which is communicated may be a management frame such as an action frame or beacon frame.

In an example, each AP may announce its r-TWT SP information (and the r-TWT SP information of the non-transmitted BSSID APs if the AP is the transmitted BSSID AP or the r-TWT SP information of the other co-hosted APs (as defined by IEEE 802.11ax) if the AP and the other APs are in one co-hosted AP set) and an r-TWT SP of its neighbor APs to allow exchange of the r-TWT SP information in a same or different ESS among the APs in the wireless network 200. Further, the r-TWT SP information may explicitly identify whether the r-TWT SP information is 1-hop neighbor's r-TWT SP information or not. A frame such as a management frame such as an action frame or beacon frame may carry the announcement. The r-TWT SP information provided by an AP for its neighboring AP is information for a one hop neighbor. In the example, the AP3 may announce in a frame 204 the r-TWT SP information of AP3, the AP1 may announce in a frame 206 the r-TWT SP information of AP1, and the AP2 may announce in a frame 208 the r-TWT SP information of AP2. Additionally or alternatively, the AP1 may announce in a frame 212 the r-TWT SP information of neighbor nodes AP2 and AP3 which it received based on the announcements, the AP2 may announce in a frame 214 the r-TWT SP of neighbor node AP1 which it received based on the announcement, and the AP3 may announce in frame 210 the r-TWT SP information of neighbor nodes AP1 which it received based on the announcement. Based on the announcement by AP1, AP2 may receive the r-TWT SP information of AP3 which is a two hop neighbor to AP2 and vice versa.

The r-TWT SP of two hop neighbors may be used to define the r-TWT SP of an AP to improve medium use efficiency.

Figure 3:
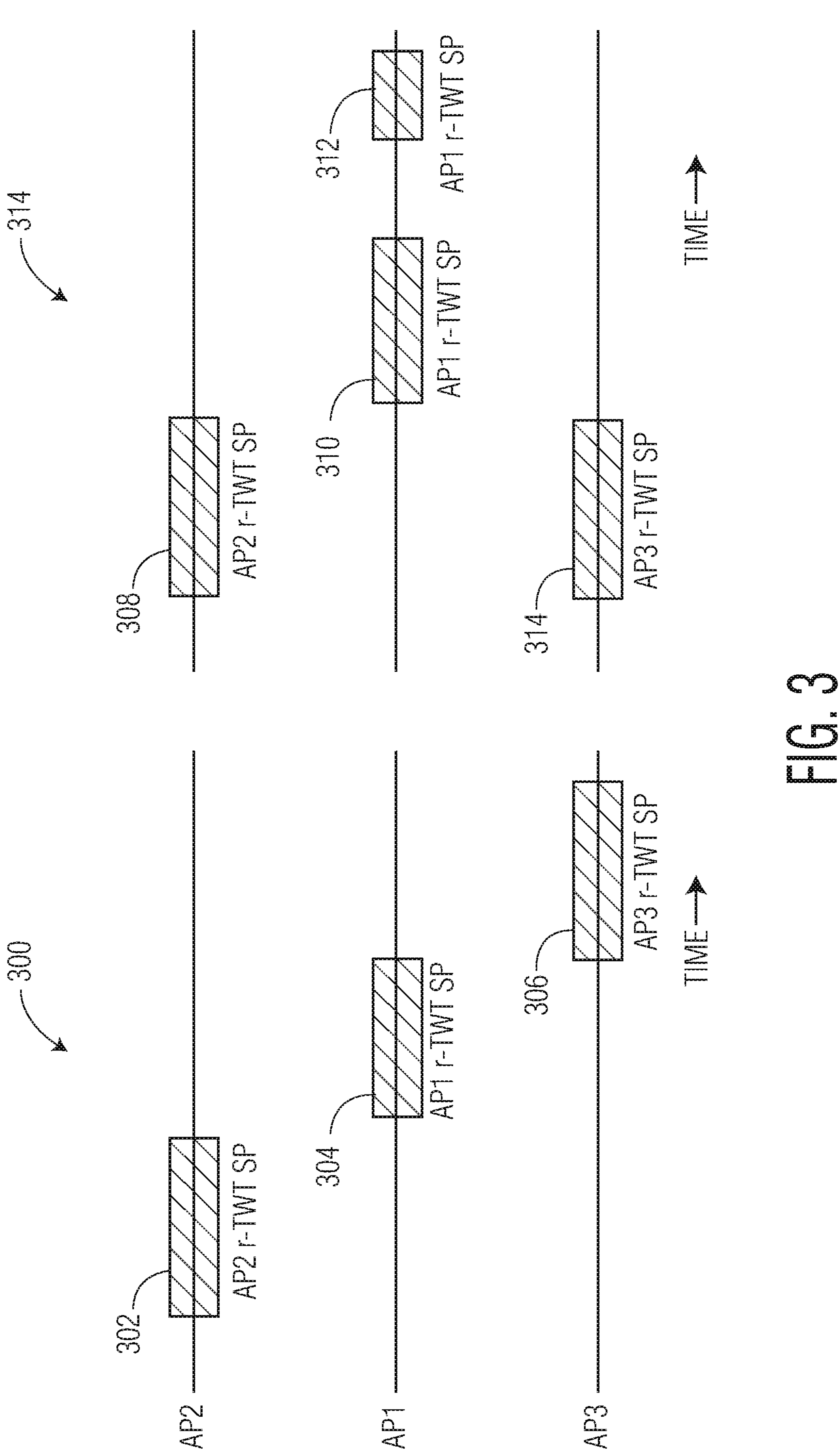
FIG. 3 illustrates an example selection of an r-TWT SP by an AP in accordance with an embodiment.

FIG. 3 illustrates an example selection of an r-TWT SP by an AP in accordance with an embodiment. The r-TWT SP of AP1, AP2, and AP3 in the wireless network 200 is shown. The r-TWT SP of APs may be initially arranged in timing diagram 300 to not overlap with each other. The AP2 may have r-TWT SP 302, the AP1 may have r-TWT SP 304, and the AP3 may have r-TWT SP 306 which do not overlap. Based on the announcement by AP1 of the r-TWT SP information of AP3 which is not neighbor of AP2, AP2 may determine that AP3 is a two hop neighbor from AP2 and cannot hear communication directly from AP3. Further, based on the announcement by AP1 of the r-TWT SP information of AP2 which is not a neighbor of AP3, AP3 may determine that AP2 is a two hop neighbor from AP3 and cannot receive frames directly from AP2. This information may be used to define the r-TWT SP of AP2 and AP3 to improve medium use efficiency. In an example, the r-TWT SP of an AP may initially not overlap in timing diagram 300 but based on a determination that AP2 and AP3 are two hop neighbors, AP3 may select an r-TWT SP 314 which overlaps with the r-TWT SP 308 of AP 2 and not overlap with the r-TWT SP 310 of AP1 in timing diagram 314. Further, the overlap may allow AP1 increase medium efficiency by being able to define another r-TWT SP 312 previously not available for use when the AP2 and AP3 are neighboring APs. In an example, an AP2 may control a maximum transmit power of frames transmitted by the STAs associated with the AP2 to reduce possible interference in an r-TWT SP of the AP3 and AP2 may perform a similar control.

In an example, the STA may be arranged to report the r-TWT SP information of its neighbor AP to the AP associated with the STA. The reporting by the STA allows an AP to obtain r-TWT SP information of APs which are not reported by a neighbor APs.

Figure 4:
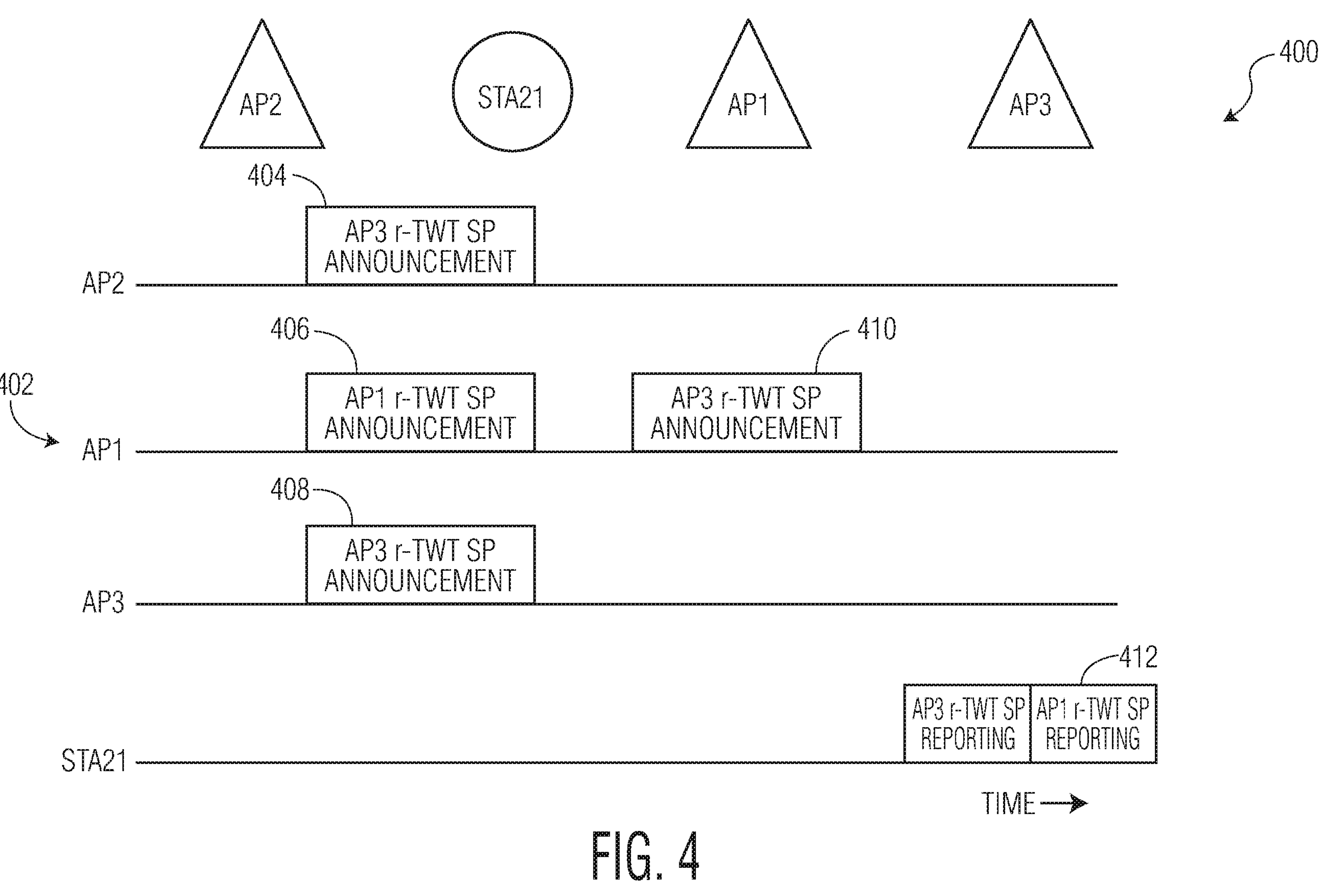
FIG. 4 illustrates an example reporting of r-TWT SP information by an STA in accordance with an embodiment.

FIG. 4 illustrates an example reporting of r-TWT SP information of an AP by an STA in accordance with an embodiment. A wireless system 400 may include an AP2 and an AP1 which is separated by STA21 in an example. The label "21" in the reference STA21 may indicate it is a first STA of one or more STAs (one of which is shown) associated with AP2. STA21 may be a neighbor of AP2 and AP1 but AP2 may not be a neighbor of AP1 or AP3 in the example. Further, AP3 and AP1 may be neighbors. In a timing diagram 402, AP2, AP1, AP3 may announce respective r-TWT SP information in a respective frame 404, 406, 408. Further, AP1 based on the announcement from AP3 may announce the r-TWT SP information of neighbor AP3 in frame 410. The STA 21 may report the r-TWT SP information indicated in the beacon of neighbor AP1 to its associated AP2. In an example, the reported r-TWT SPs may be included in one or more management frames 412 such as action frames. Further, based on the announcement by the neighbor AP1, the STA21 may report the r-TWT SP information of the neighbor AP to neighbor AP1 (which is the r-TWT SP of AP3). In an example, the reported r-TWT SPs information may be included in one or more management frames 412 such as action frames. The STA21 may report the r-TWT SPs of AP1 and AP3 to its associated AP2 when the announced r-TWT SPs overlaps with the r-TWT SP of the associated AP2. Additionally, or alternatively, the STA may cause the AP2 to negotiate with the STA an r-TWT SP which does not overlap with the r-TWT SPs of AP1. For example, the STA may send a TWT request to the AP2 to change the r-TWT SP of the AP2 so that it does not overlap with r-TWT SPs of AP1 and the AP2 may provide a response of the adjusted r-TWT SP of the AP2, where the TWT request and TWT response are defined in accordance with 802.11 and indicated in a respective management frame such as action frames. The r-TWT SP of the AP may be negotiated in other ways as well.

In an example, an AP which receives an r-TWT SP of another AP may indicate whether it respects the r-TWT SP of the other AP. The AP may respect the r-TWT SP of the other AP and also indicate to the associated STA of the AP to respect the r-TWT SP of the other AP. Further an AP may negotiate with another AP whether one of them respect the r-TWT SPs of another AP of them. By respect, the AP may not define an r-TWT SP which overlaps with the r-TWT SP of the other AP, and the AP and its associated STAs stop their TXOPs at the start time of r-TWT SP of the other AP.

Figure 5:
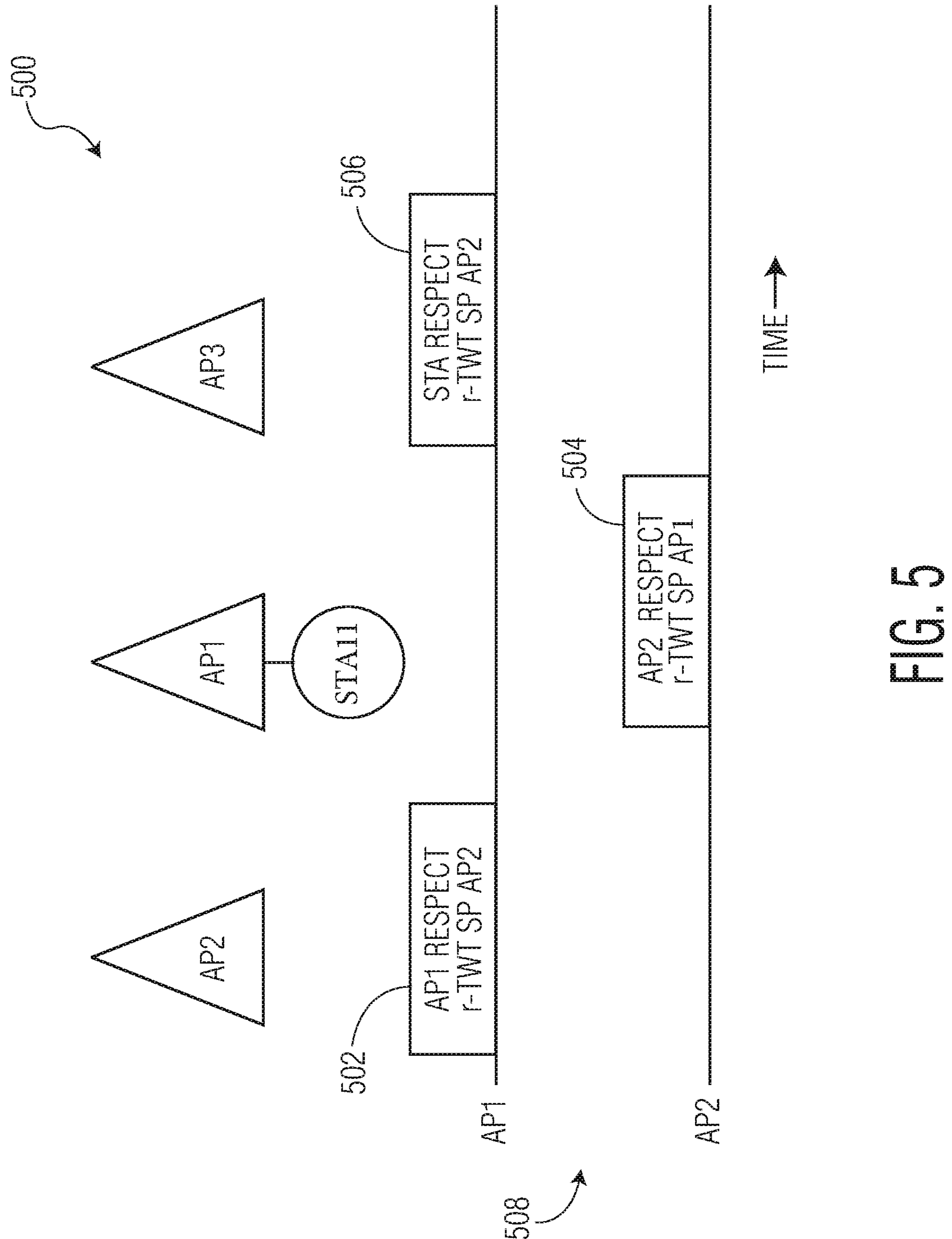
FIG. 5 illustrates an example announcement in a wireless system of whether an AP respects an r-TWT SP of a neighbor AP in accordance with an embodiment.

FIG. 5 illustrates an example announcement in a wireless system 500 of whether an AP respects an r-TWT SP of a neighbor AP in accordance with an embodiment. In an example, r-TWT SPs of the AP and its neighbor AP may not overlap and the AP and its associated STA stop their TXOPs at the start time of r-TWT SP of the other AP. The wireless system 500 may include a plurality of APs including AP2, AP1, and AP3 and an STA11 associated with AP1. In an example, an AP may announce whether it respects an r-TWT SP of another AP and if the AP respects the r-TWT SP of other AP announce that its associated STA is also to provide a same respect. A management frame such as a beacon frame or action frame may carry the announcement or indication that the STA is to respect the r-TWT SP of the other AP. By respect, an AP or STA may stop its TXOP at a beginning of the other AP's r-TWT SP.

In one example, the AP1 may not be in a same ESS as AP2. Based on timing diagram 508, the AP1 may announce (e.g. through a 1-bit field) in frame 502 that it respects the r-TWT SP of neighbor AP2. The AP1 may also detect if AP2 announces that it respects the r-TWT SP of AP1. If AP2 also announces that it respects the r-TWT SP of the neighbor AP1 in frame 504 and AP1 detects this announcement, then AP1 may announce in a frame 506 to associated STA the r-TWT SP information (e.g. r-TWT start time, service interval, service duration) of AP2 that its associated STAs need to respect. Based on the respect, the STA and AP1 in the example stops a TXOP at a beginning of the r-TWT SP of the AP2. If AP2 does not announces that it respects the r-TWT SP of the neighbor AP1 in frame 504, then AP1 will not announce the r-TWT SP information of neighbor AP2 for its associated STAs to respect. In another example, the AP1 and AP2 may negotiate whether each of them needs to respect the r-TWT SP of another AP of them through Action frames. If they agree to respect the peer AP's r-TWT SP, each AP and its associated STAs stop their TXOP at the beginning the another AP's r-TWT SP.

In another example, the AP1 may be in a same ESS as AP2. Based on timing diagram 508, the AP1 may announce in frame 502 that it respects the r-TWT SP of neighbor AP2. If AP2 also announces that it respects the r-TWT SP of the neighbor AP1 in frame 504, then AP1 may announce or report in the frame 506 to associated STAs to the AP2's r-TWT SP information that AP1's associated STAs need to respect. Based on the respect, the STA11 in the example stops a TXOP at a beginning of the r-TWT SP of the AP2. If AP2 does not announces that it respects the r-TWT SP of the neighbor AP1 in frame 504, then AP1 will not announce AP2's r-TWT SP information that AP1's associated STAs need to respect. In another example, whether an AP needs to respect another AP's r-TWT SP in the same ESS is the policy of the ESS.

In some examples, an STA may not need to respect a neighbor AP's r-TWT SP by stopping its TXOP at the start time of neighbor AP's r-TWT SP and have non-overlapped r-TWT SP. The respect of the STA of an r-TWT SP may be selective depending on a condition.

Figure 6:
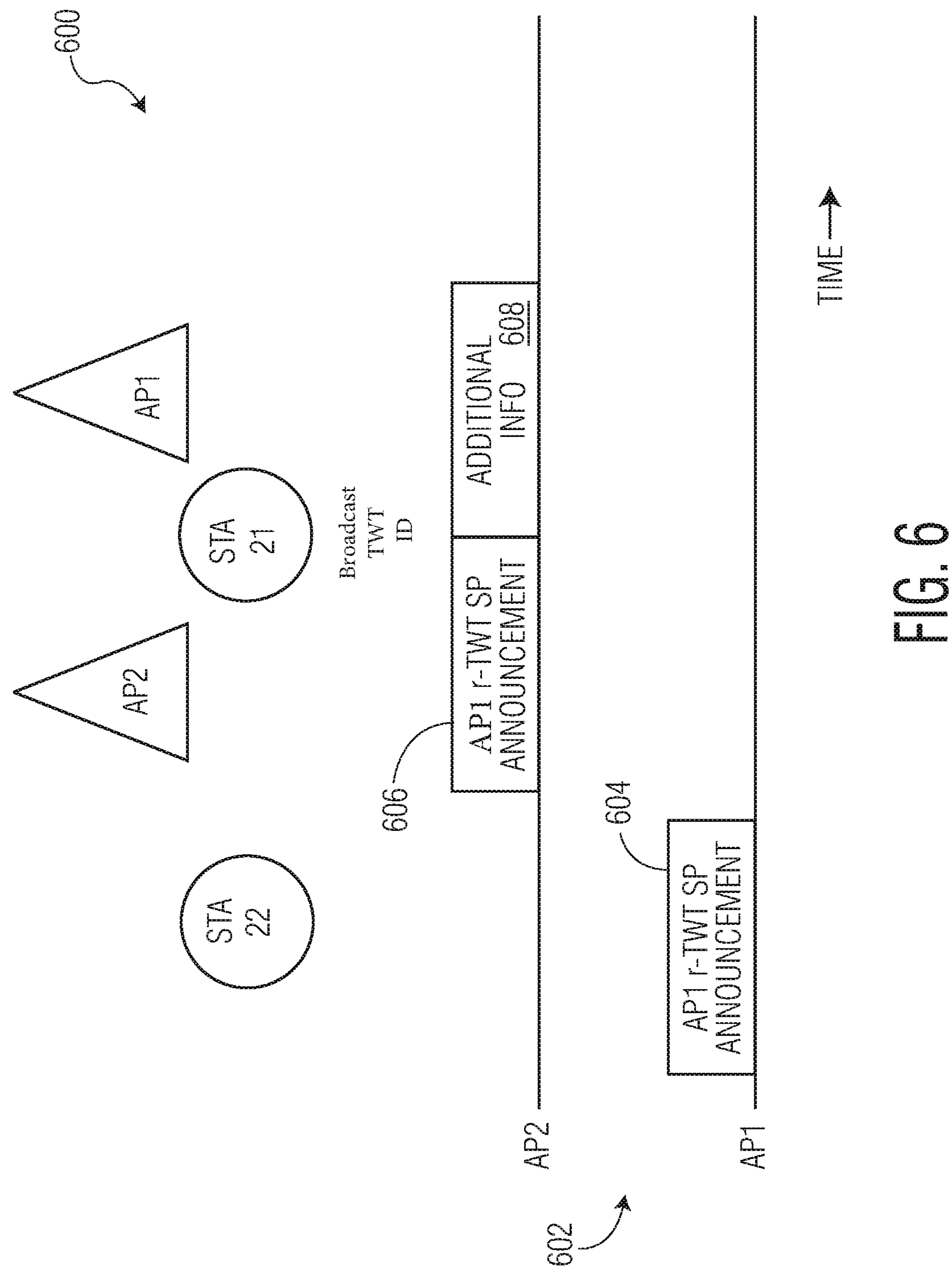
FIG. 6 illustrates an example announcement in a wireless system of whether an STA associated with an AP is to respect an r-TWT SP of a neighbor AP in accordance with an embodiment.

FIG. 6 illustrates an example announcement in a wireless system 600 associated with whether an STA associated with an AP is to respect an r-TWT SP of a neighbor AP in accordance with an embodiment. The wireless system 600 may include a plurality of APs including AP2, AP1 and STA 21 and STA22. In an example, STA21 and STA 22 may be one hop neighbors to AP2 but not AP1.

Communication by AP2 is shown as timing diagram 602. In an example, AP1 may announce in a frame 604 the r-TWT SP of AP1 which is a neighbor AP to AP2 and AP2 may announce in a frame 606 the r-TWT SP of AP1. Further, the AP2 may announce as additional information 608 in the frame 606 whether one or more associated STAs of AP2 should respect the r-TWT SP of AP1. In an example, STA21 may hear a beacon from AP1 and be neighbors but STA22 may not hear the beacon from AP1 and not be neighbors. The respect may include an STA21 stopping a TXOP that overlaps with the r-TWT SP of AP1. The additional information may take many forms.

In one example, the frame 606 may be broadcast by the AP2 and indicate a broadcast TWT identification (ID) in the additional information 608. A broadcast TWT is a shared TWT session for member stations and if a STA is assigned the broadcast TWT ID, the STA is a member of a broadcast TWT and if the STA is not assigned the broadcast TWT ID, the STA is not a member of a broadcast TWT. In an example, the STA21 may be assigned the broadcast TWT ID and be a member station of the broadcast TWT ID where the r-TWT SP identified by the broadcast TWT ID is overlapped with AP1's r-TWT SP and STA22 may not be assigned the broadcast TWT ID and not be a member of the broadcast TWT ID where the r-TWT SP identified by the broadcast TWT ID is overlapped with AP1's r-TWT SP. The additional information 608 may indicate whether STA21 should stop its TXOP at the beginning time of the neighbor AP1's r-TWT SP. The TXOP of the STA22 may not stop at the start time of the r-TWT SP of AP1.

In another example, the AP2 may announce a signal quality indication such as received signal strength indication (RSSI) of an inter-BSS frame which is received by an associated STA (e.g., STA22 or STA21) from a neighbor BSS in the additional information 608 of the frame 606. If the associated STA receives an inter-BSS frame of the neighbor BSS that exceeds the indicated threshold of the signal quality during a certain duration, the associated STA may respect the neighbor AP's r-TWT SP by (1), not joining a r-TWT SP of its associated AP if the r-TWT SP overlaps with neighbor AP's r-TWT SP and/or (2), terminating its TXOP at a start of the neighbor AP's r-TWT SP. Otherwise, the associated STA may ignore the neighbor AP1's r-TWT SP and not terminate a TXOP at a start of the neighbor AP's r-TWT SP. The AP may also announce other restrictions when a STA doesn't stop its TXOP at the beginning of neighbor AP's r-TWT SP, e.g. the Tx power restriction.

In some examples, the AP2 may report to the associated STA in a frame the neighbor AP's r-TWT SP. The frame may also include the additional information which the associated STA is to use to determine whether to respect the r-TWT SP of the AP1. The frame may be individually addressed to the STA 21 rather than being broadcast.

Figure 7:
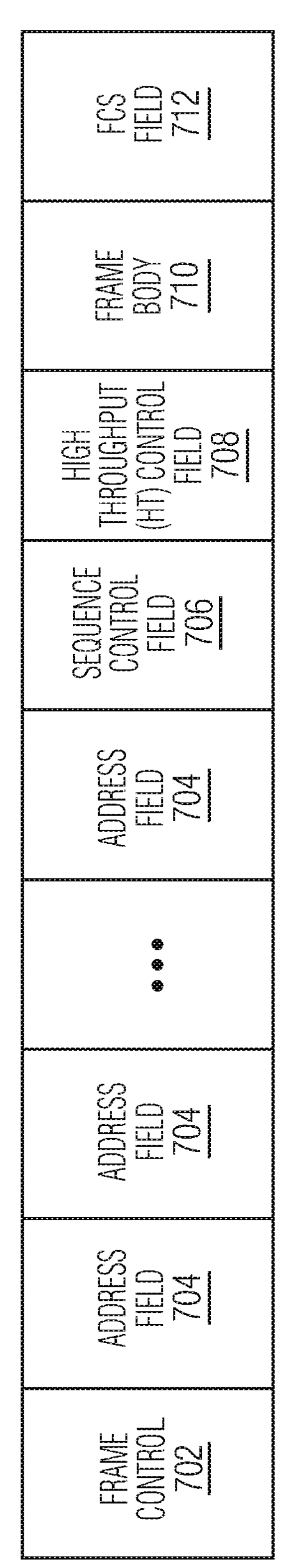
FIG. 7 illustrates an example of an action frame in accordance with an embodiment.

FIG. 7 illustrates an example of an action frame 700 in accordance with an embodiment. The action frame 700 may be transmitted by an AP or STA to announce or report information associated with a r-TWT SP as described above.

The action frame 700 may have a frame control 702 which indicates one or more of a type and subtype that indicates the frame is an action frame. Further, the frame 700 may include one or more address fields 704 which could indicate one or more of BSSID of a source and destination of the frame 700, a sequence control field 706, and an high throughput (HT) control field 708. A frame body 710 may indicate a type of the action frame 700. For example, the frame body 710 may indicate that the type of action frame is an announcement of an r-TWT SP of an AP, an announcement that an AP respects an r-TWT of another AP, an announcement that an STA is to respect an r-TWT of an AP, or an STA reporting of r-TWT SP of neighbor APs, as examples. The frame body 710 may also include various fields or elements associated with the type of the action frame 700 such as a TWT element as described below. The action frame 700 may end with a frame checksum (FCS) field 712. The address fields 704 may indicate whether the frame is a broadcasted compared to being individually addressed to a particular AP or STA in an example.

In an example, a target wakeup time (TWT) element may be used to announce an r-TWT SP of an AP, announce that an AP respects an r-TWT of another AP, announce that an STA is respects an r-TWT of an AP, or negotiate a r-TWT SP.

Figure 8:
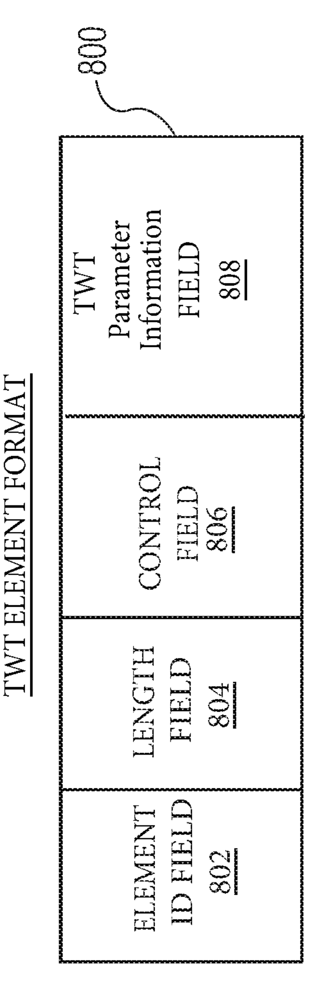
FIG. 8 illustrates an example of a Target Wake Time (TWT) element in accordance with an embodiment.

FIG. 8 illustrates an example of a Target Wake Time (TWT) element 800 in accordance with an embodiment. The TWT element 800 may be used to announce or report information associated with an r-TWT SP as described above and be transmitted in a beacon frame or an action frame 700. In an example, the beacon frame or action frame 700 may carry one or more instances of the TWT element 800.

The TWT element 800 includes an Element ID field 802, a Length field 804, a Control field 806 and a TWT Parameter Information field 808. The TWT Parameter Information field 808 may include TWT parameter information 820 including a request type 810, a Target Wake Time field 812, a TWT Wake Duration field 814, a TWT Wake Interval Mantissa field 816, and a Broadcast TWT Info field 818. In an example, the Element ID field 802 may indicate that the type of TWT frame is an announcement of an r-TWT SP of an AP, an announcement that an AP respects an r-TWT of another AP, an announcement that an STA is to respect an r-TWT of an AP, an STA reporting of r-TWT SP of neighbor APs, a TWT setup request or a TWT setup response associated with r-TWT SP negotiation, or a broadcast TWT with an ID as examples. The Broadcast TWT Info field 818 may include various fields or elements which carry data or information associated with the type of the TWT element. In an example, the Control field 806 may be appropriately set to indicate presence of one or more instances of the TWT Parameter Information Set in the TWT Parameter Information field 808.

Figure 9:
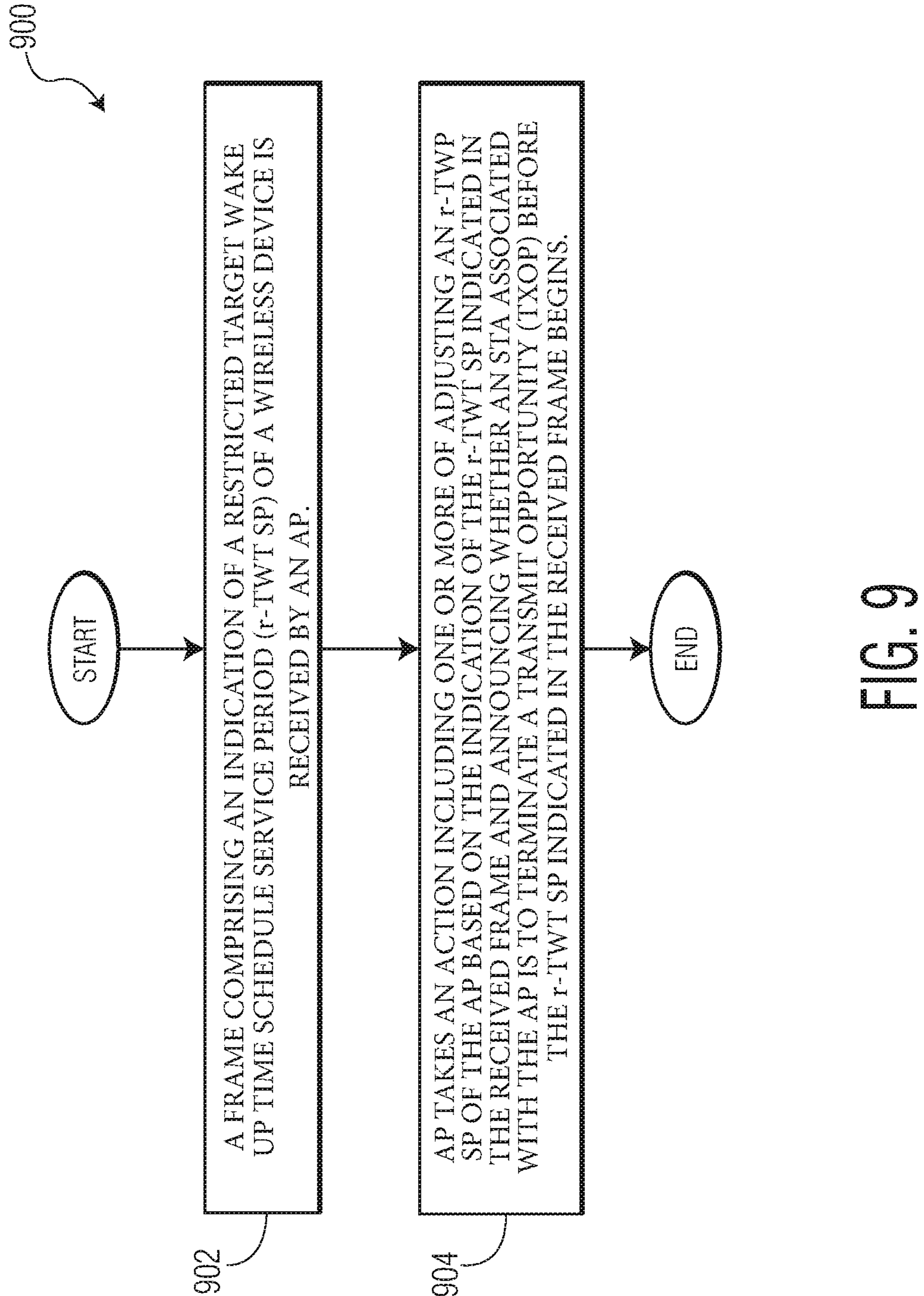
FIG. 9 is a flow chart of functions associated with coordination of frame transmissions based on r-TWT SP of APs in accordance with an embodiment.

FIG. 9 is a flow chart of functions 900 associated with coordination of frame transmissions associated with r-TWT SP of APs in accordance with an embodiment. The functions 900 may be performed by the r-TWT SP coordination logic of an AP in an example. At 902, a frame comprising an indication of a restricted target wake up time schedule service period (r-TWT SP) of a wireless device is received by the AP. The frame with the r-TWT SP may be received from a neighbor AP to the AP, an STA which is a neighbor to the AP as a reporting from the STA, or an announcement from the neighbor AP in an example. In an example, the frame may indicate an r-RWT of a neighbor AP to the AP or r-TWT SP of a two-hop neighbor to the AP. At 904, the AP takes an action including one or more of adjusting an r-TWP SP of the AP based on the indication of the r-TWT SP indicated in the received frame and announcing whether an STA associated with the AP is to terminate a transmit opportunity (TXOP) before the r-TWT SP indicated in the received frame begins. In some examples, the AP may announce whether it respects the r-TWT SP of the AP indicated in the received frame before indicating whether an STA associated with the AP is to terminate a transmit opportunity (TXOP) before the r-TWT SP indicated in the received frame begins. The functions 900 reduce interference between r-TWT SPs associated with different wireless devices and increases data throughput.

Figure 10:
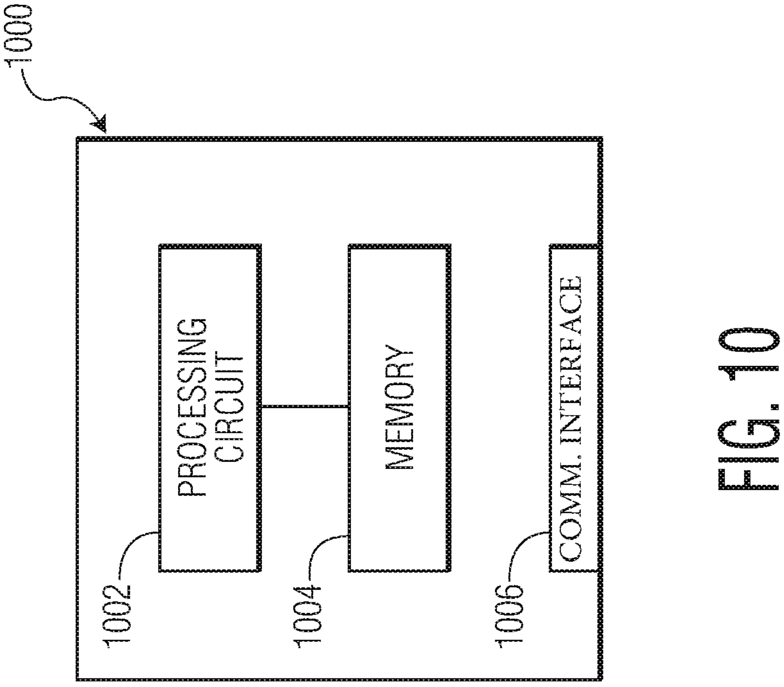
FIG. 10 illustrates an example processing system which implements functions associated with coordinating r-TWT SP in accordance with an embodiment.

FIG. 10 illustrates an example processing system which implements functions associated with coordinating r-TWT SP in a wireless system in accordance with an embodiment. As shown, the system 1000 includes a processing circuit 1002, a memory 1004, and a communications interface 1006. The processing circuit 1002 may include a multifunction processor, an application-specific processor, and/or a dedicated hardware circuit. As an example, the processor could be a CPU (with software), an application-specific integrated circuit (ASIC), a transceiver, a radio, or a combination thereof. The memory may include, for example, storage medium such as read only memory (ROM), flash memory, random-access memory (RAM), and a large capacity permanent storage device such as a hard disk drive which stores the r-TWT SP coordination logic 120. A communications interface 1006 enables communications with other computers via, for example, the Internet Protocol (IP). The computer executes computer readable instructions stored in the storage medium to implement the various functions as described above.

In an embodiment, a method is disclosed. The method comprises: receiving a frame comprising an indication of a restricted target wake up time schedule service period (r-TWT SP) from a wireless device; and one or more of adjusting an r-TWP SP of the AP based on the indication of the r-TWT SP in the received frame and announcing that an STA associated with the AP is to terminate a transmit opportunity (TXOP) before the r-TWT SP indicated in the received frame begins. In an example, adjusting the r-TWT SP of the AP based on the indication of the r-TWT SP comprises overlapping the r-TWT SP of the AP with the r-TWT SP indicated by the frame to increase an r-TWT SP of another wireless device, the AP and another AP having the r-TWT SP indicated by the received frame are separated by two hops. In an example, the AP and the other AP restricts a transmit power of a client station (STA) associated with a respective AP. In an example, a client station (STA) reports r-TWT SP information of a neighbor AP of the STA to the AP, the STA associated with the AP, when the r-TWT SP of the neighbor AP overlaps with the r-TWT SP of the AP. In an example, the STA terminates the TXOP before the r-TWT SP indicated by the received frame begins when the AP and the neighbor AP are in a different extended service set (ESS). In an example, the STA terminates the TXOP before the r-TWT SP indicated by the received frame begins when the AP and the neighbor AP are in a same extended service set and based on a policy of the ESS. In an example, announcing that the STA is to terminate the TXOP before the r-TWT SP indicated in the received frame begins comprises announcing a broadcast TWT identification which indicates for those associated STA which are members of the broadcast TWT identification to terminate the TXOP before the r-TWT SP indicated in the received frame begins. In an example, announcing that the STA is to terminate the TXOP before the r-TWT SP indicated in the received frame begins comprises announcing a signal quality measure, wherein the STA is to terminate the TXOP before the r-TWT SP indicated in the received frame begins when the STA receives a frame from the wireless device having the r-TWT SP and meeting the signal quality measure. In an example, announcing that the STA is to terminate the TXOP before the r-TWT SP indicated in the received frame begins comprises announcing the r-TWT SP indicated in the received frame and that the STA is to terminate the TXOP before the r-TWT SP indicated in the received frame begins. In an example, receiving the frame comprises receiving an announcement of r-TWT SP information of a neighbor AP to the wireless device and r-TWT SP information of the wireless device. In an example, the method further comprises the AP announcing that the AP respects the r-TWT SP indicated in the received frame by stopping the r-TWT SP of the AP before the r-TWT SP indicated in the received frame begins.

In another embodiment, an AP is disclosed. The AP is arranged to receive a frame comprising an indication of a restricted target wake up time schedule service period (r-TWT SP) from a wireless device; and one or more of adjust an r-TWP SP of the AP based on the indication of the r-TWT SP in the received frame and announcing that an STA associated with the AP is to terminate a transmit opportunity (TXOP) before the r-TWT SP indicated in the received frame begins. In an example, the AP arranged to adjust comprises the AP arranged to overlap the r-TWT SP of the AP with the r-TWT SP indicated by the received frame to increase an r-TWT SP of another wireless device, the AP and another AP having the r-TWT SP indicated by the received frame are separated by two hops. In an example, the AP and the other AP restricts a transmit power of a client station associated with a respective AP. In an example, a client station (STA) reports r-TWT SP information of a neighbor AP of the STA to the AP, the STA associated with the AP, when the r-TWT SP of the neighbor AP of the STA overlaps with the r-TWT SP of the AP. In an example, the STA is arranged to terminate the TXOP before the r-TWT SP indicated by the received frame begins when the AP and the other AP are in a different extended service set. In an example, the AP is arranged to announce that the STA is to terminate the TXOP comprises the AP arranged to announce a broadcast TWT identification which indicates for those associated STA which are members of the broadcast TWT identification to terminate the TXOP before the r-TWT SP indicated in the received frame begins. In an example, the AP is arranged to announce that the STA associated with the AP is to terminate the TXOP comprises the AP arranged to announce the r-TWT SP indicated in the received frame and that the STA is to terminate the TXOP before the r-TWT SP indicated in the received frame begins. In an example, the frame is one of a beacon frame and an action frame. In an example, the beacon frame or action frame comprises a TWT element which indicates the STA is to terminate the TXOP before the r-TWT SP indicated in the received frame begins.

A few implementations have been described in detail above, and various modifications are possible. The disclosed subject matter, including the functional operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

We claim:

1. A method comprising:

receiving a frame comprising an indication of a restricted target wake up time schedule service period (r-TWT SP) from a wireless device; and one or more of adjusting an r-TWT SP of an AP based on the indication of the r-TWT SP in the received frame and announcing that an STA associated with the AP is to terminate a transmit opportunity (TXOP) before the r-TWT SP indicated in the received frame begins only when a management frame is also received from the wireless device with an indication that announces the wireless device respects the r-TWT SP of the AP.

2. The method of claim 1, wherein adjusting the r-TWT SP of the AP based on the indication of the r-TWT SP of the wireless device comprises overlapping the r-TWT SP of the AP with the r-TWT SP of the wireless device indicated by the frame to increase an r-TWT SP of another wireless device, the AP and another AP having the r-TWT SP indicated by the received frame are separated by two hops.

3. The method of claim 2, wherein the AP and the other AP restricts a transmit power of a client station (STA) associated with a respective AP.

4. The method of claim 1, wherein a client station (STA) reports r-TWT SP information of a neighbor AP of the STA to the AP, the STA associated with the AP, when the r-TWT SP of the neighbor AP overlaps with the r-TWT SP of the AP.

5. The method of claim 4, wherein the STA terminates the TXOP before the r-TWT SP indicated by the received frame begins when the AP and the neighbor AP are in a different extended service set (ESS).

6. The method of claim 4, wherein the STA terminates the TXOP before the r-TWT SP indicated by the received frame begins when the AP and the neighbor AP are in a same extended service set and based on an ESS policy.

7. The method of claim 1, wherein announcing that the STA is to terminate the TXOP before the r-TWT SP indicated in the received frame begins comprises announcing a broadcast TWT identification which indicates for those associated STA which are members of the broadcast TWT identification to terminate the TXOP before the r-TWT SP indicated in the received frame begins.

8. The method of claim 1, wherein announcing that the STA is to terminate the TXOP before the r-TWT SP indicated in the received frame begins comprises announcing a signal quality measure, wherein the STA is to terminate the TXOP before the r-TWT SP indicated in the received frame begins when the STA receives a frame from the wireless device having the r-TWT SP and meeting the signal quality measure.

9. The method of claim 1, wherein announcing that the STA is to terminate the TXOP before the r-TWT SP indicated in the received frame begins comprises announcing the r-TWT SP indicated in the received frame and that the STA is to terminate the TXOP before the r-TWT SP indicated in the received frame begins.

10. The method of claim 1, wherein receiving the frame comprises receiving an announcement of r-TWT SP information of a neighbor AP to the wireless device and r-TWT SP information of the wireless device.

11. The method of claim 1, further comprising the AP announcing that the AP respects the r-TWT SP indicated in the received frame by stopping the r-TWT SP of the AP before the r-TWT SP indicated in the received frame begins.

12. An access point (AP) arranged to receive a frame comprising an indication of a restricted target wake up time schedule service period (r-TWT SP) from a wireless device; and one or more of adjust an r-TWP SP of the AP based on the indication of the r-TWT SP in the received frame and announcing that an STA associated with the AP is to terminate a transmit opportunity (TXOP) before the r-TWT SP indicated in the received frame begins only when a management frame is also received from the wireless device with an indication that announces the wireless device respects the r-TWT SP of the AP.

13. The AP of claim 12, wherein the AP arranged to adjust comprises the AP arranged to overlap the r-TWT SP of the AP with the r-TWT SP of the wireless device indicated by the received frame to increase an r-TWT SP of another wireless device, the AP and another AP having the r-TWT SP indicated by the received frame are separated by two hops.

14. The AP of claim 13, wherein the AP and the other AP restricts a transmit power of a client station associated with a respective AP.

15. The AP of claim 12, wherein a client station (STA) reports r-TWT SP information of a neighbor AP of the STA to the AP, the STA associated with the AP, when the r-TWT SP of the neighbor AP of the STA overlaps with the r-TWT SP of the AP.

16. The AP of claim 15, wherein the STA is arranged to terminate the TXOP before the r-TWT SP indicated by the received frame begins when the AP and the other AP are in a different extended service set.

17. The AP of claim 12, wherein the AP arranged to announce that the STA is to terminate the TXOP comprises the AP arranged to announce a broadcast TWT identification which indicates for those associated STA which are members of the broadcast TWT identification to terminate the TXOP before the r-TWT SP indicated in the received frame begins.

18. The AP of claim 12, wherein the AP arranged to announce that the STA associated with the AP is to terminate the TXOP comprises the AP arranged to announce the r-TWT SP indicated in the received frame and that the STA is to terminate the TXOP before the r-TWT SP indicated in the received frame begins.

19. The AP of claim 12, wherein the frame is one of a beacon frame and an action frame.

20. The AP of claim 19, wherein the beacon frame or action frame comprises a TWT element which indicates the STA is to terminate the TXOP before the r-TWT SP indicated in the received frame begins.

* * * * *